US010173275B2

(12) United States Patent
Roman

(10) Patent No.: US 10,173,275 B2
(45) Date of Patent: Jan. 8, 2019

(54) CUTTING TOOL WITH REPLACEABLE ABUTMENT MEMBERS AND TOOLHOLDER AND CUTTING INSERT THEREFOR

(71) Applicant: SANDVIK INTELLECTUAL PROPERTY AB, Sandviken (SE)

(72) Inventor: Stefan Roman, Valbo (SE)

(73) Assignee: SANDVIK INTELLECTUAL PROPERTY, Sandviken (SE)

( * ) Notice: Subject to any disclaimer, the term of this patent is extended or adjusted under 35 U.S.C. 154(b) by 83 days.

(21) Appl. No.: 14/564,319

(22) Filed: Dec. 9, 2014

(65) Prior Publication Data

US 2015/0165527 A1 Jun. 18, 2015

(30) Foreign Application Priority Data

Dec. 13, 2013 (EP) .................................... 13197109

(51) Int. Cl.
*B23C 5/20* (2006.01)
*B23C 5/22* (2006.01)

(52) U.S. Cl.
CPC .......... *B23C 5/2247* (2013.01); *B23C 5/2213* (2013.01); *B23C 2200/04* (2013.01); *B23C 2200/168* (2013.01); *B23C 2200/361* (2013.01); *B23C 2210/163* (2013.01); *B23C 2210/165* (2013.01); *B23C 2210/168* (2013.01); *Y10T 407/2274* (2015.01); *Y10T 407/23* (2015.01)

(58) Field of Classification Search
CPC ..... B23B 2200/16; B23B 2200/161167; B23B 2200/165; B23B 2205/12; B23C 2200/16; B23C 2200/161; B23C 2200/168; B23C 2200/165
See application file for complete search history.

(56) References Cited

U.S. PATENT DOCUMENTS 1,460,030 A 6/1923 Mattson
2,289,344 A * 7/1942 Cedarleaf ............... B23B 27/06 407/103

(Continued)

FOREIGN PATENT DOCUMENTS

DE 3321184 A1 12/1984
EP 0300172 A2 1/1989

(Continued)

*Primary Examiner* — Will Fridie, Jr.
(74) *Attorney, Agent, or Firm* — Corinne R. Gorski

(57) ABSTRACT

A toolholder includes a bottom abutment surface, a projection extending upwardly from the bottom abutment surface, the projection including an internally threaded opening, having a central axis that is offset from a central axis of the projection in a first direction, and a clamping screw having external threads for mating with threads of the internally threaded opening and a head having a bottom clamping surface shaped as a truncated cone for contacting an insert clamping surface and urging an insert substantially in a first direction when the clamping screw is tightened relative to the toolholder and the insert. The toolholder also includes at least one abutment member extending from a side wall of the projection in a radial direction, each abutment member having an abutment point, at least which is closer to the central axis of the projection than to the central axis of the internally threaded opening.

16 Claims, 5 Drawing Sheets

37 33 39 35 C1 C2 23 47 49 57 41 63 65 59 21 75 55 31 69 25 67 C3 29 27 43 53 45 51 43 51 53

(56) References Cited

U.S. PATENT DOCUMENTS

| | | | | |
|---|---|---|---|---|
| 4,315,706 | A * | 2/1982 | Erkfritz | B23B 27/1611 407/101 |
| 7,300,232 | B2 * | 11/2007 | Wiman | B23B 27/145 407/101 |
| 8,573,903 | B2 * | 11/2013 | Morrison | B23C 5/2213 407/100 |
| 2013/0202371 | A1 * | 8/2013 | Chen | B23B 27/16 407/107 |

FOREIGN PATENT DOCUMENTS

| | | | |
|---|---|---|---|
| EP | 0599393 | A1 | 6/1994 |
| EP | 1535681 | A1 | 6/2005 |
| JP | S6440205 | A | 2/1989 |
| WO | 2013051703 | A1 | 4/2013 |

* cited by examiner

CUTTING TOOL WITH REPLACEABLE ABUTMENT MEMBERS AND TOOLHOLDER AND CUTTING INSERT THEREFOR

RELATED APPLICATION DATA

This application claims priority under 35 U.S.C. § 119 to EP Patent Application No. 13197109.5, filed on Dec. 13, 2013, which the entirety thereof is incorporated herein by reference.

TECHNICAL FIELD

The present disclosure relates to cutting tools, toolholders, and cutting inserts and, more particularly, to insert mounting arrangements for such tools, toolholders, and inserts.

BACKGROUND

A common technique for mounting a cutting insert relative to a toolholder in a cutting tool is to form a pocket having a bottom abutment surface and two side abutment surfaces in the toolholder. A cutting insert having a bottom supporting surface and a plurality of side supporting surfaces is then clamped in the pocket so that the bottom supporting surface contacts the bottom abutment surface of the pocket and the side supporting surfaces contact the side abutment surfaces of the pocket. In this way, three points of contact are provided between the insert and the pocket, providing for necessary stability of the insert. Inserts and toolholders are typically not designed to have more than three points of contact between the insert and the toolholder. This is because the level of precision necessary to provide more than three points of contact is quite difficult to obtain and typically results in a situation sometimes referred to as "overdetermination," whereby at least one of the intended points of contact is not in a good contacting relation and can cause the insert to be improperly located or permit undesired movement of the insert.

One technique for clamping an insert relative to the pocket of the toolholder is to provide a through hole in the insert with an inverted truncated conical shape at a top end of through hole, and a screw with a head having a generally matching conical shape on a bottom side of the head. The conical shapes of the head and the through hole contact as the screw is screwed into a threaded hole in the bottom abutment surface and the insert is thereby clamped relative to the pocket. Often, the location of the threaded hole is located so that, as the conical clamping surfaces come into contact when then screw is tightened relative to the toolholder and the insert, the side supporting surfaces of the insert are urged toward the side abutment surfaces of the pocket.

A disadvantage of this arrangement is that inserts tend to have slight variations in size. This may occur in a cemented carbide insert, for example, as the result of changes that occur in the shape of a pressed insert during sintering of the insert. The position of a cutting edge of the insert relative to the toolholder depends upon the distance between the points on the insert supporting surfaces that contact the insert abutment surfaces and the cutting edge. Variations in size from one insert to another can result in damage to a workpiece or poor quality finishes.

One solution to this problem has been to provide a "bottom locking" arrangement, wherein a projection is provided on the bottom abutment surface of pocket and is received in the through-hole of the insert. Contact between the projection and the interior surface of the through-hole can replace contact between side abutment surfaces of the pocket and side supporting surfaces of the insert. Because the distance between the point(s) at which the projection and the interior surface of the through-hole contact and the working cutting edge is less than the distance between the points at which side abutment surfaces contact side supporting surfaces and the cutting edge, the effect of variations in insert size is less pronounced.

Disadvantages with such bottom locking arrangements include that the projection is typically close to the bottom surface of the insert and, thus, there tends to be poor support for the insert during cutting operations. Also, the projections typically include sloped surfaces and the insert may tend to ride up the slopes when cutting forces are exerted on the insert.

Disadvantages to both bottom locking arrangements and arrangements wherein side abutment surfaces and side supporting surfaces contact include that, if the projection in a bottom locking arrangement or any abutment surface of pocket is damaged, it may not be possible to properly seat an insert against the surface. Repairs to the toolholder, if possible at all, can be complex and expensive.

It is desirable to provide a cutting tool that provides for accurate mounting of inserts. It is also desirable to provide a cutting tool that facilitates simple repair of damaged abutment surfaces on a toolholder.

SUMMARY

In accordance with an aspect of the present disclosure, a toolholder includes a bottom abutment surface, a projection extending upwardly from the bottom abutment surface, the projection including an internally threaded opening, the internally threaded opening having a central axis that is offset from a central axis of the projection in a first direction, and a clamping screw having external threads for mating with internal threads of the internally threaded opening and a head having a bottom clamping surface shaped as a truncated cone for contacting an insert clamping surface and urging an insert in substantially the first direction when the clamping screw is tightened relative to the toolholder and the insert. The toolholder also includes at least one abutment member extending from a side wall of the projection in a radial direction, each abutment member having an abutment point, at least the abutment point of the at least one abutment member being closer to the central axis of the projection than to the central axis of the internally threaded opening.

The toolholder as described can facilitate accurate mounting of inserts by minimizing a distance between the cutting edges of the insert and the abutment surfaces that contact supporting surfaces of the insert. In addition, the abutment members may be of a type that is easily replaced in the event of damage.

According to an aspect of the disclosure, the projection is generally circularly cylindrical. This can facilitate forming the projection on the toolholder.

According to an aspect of the disclosure, each of the at least one abutment members is a circularly cylindrical pin. This structure facilitates simple manufacture of the abutment members, and suggests a simple technique for fixing them relative to the projection in simple-to-form circularly cylindrical holes or recesses.

In accordance with another aspect of the disclosure, a cutting tool includes a tool holder as described, and the cutting insert attachable to the toolholder. The insert has a bottom supporting surface for supporting the insert against the bottom abutment surface, a top surface, and a through-hole for receiving the projection extending from the bottom supporting surface to the top surface, the through-hole comprising an internal, cylindrical wall portion and an inverted truncated conical insert clamping surface between the cylindrical wall and the top surface, characterized in that the through-hole comprises a plurality of recesses having recess supporting surfaces in the cylindrical wall arranged to receive the at least one abutment member so that the abutment point of each abutment member of the at least one abutment member abuts against a corresponding one of the recess supporting surfaces when the clamping screw is tightened relative to the toolholder and the insert and moves the insert in the first direction. The cutting tool can facilitate accurate mounting of inserts by minimizing a distance between the cutting edges of the insert and the abutment surfaces that contact supporting surfaces of the insert. The cutting tool facilitates accurate positioning of a cutting edge on the toolholder because a distance between a cutting edge of the insert and an abutment surface against which recess supporting surfaces abut can be minimized. In addition, the recess supporting surfaces can extend to a substantial height in the insert by the clamping surface and can abut corresponding, high abutment surfaces, facilitating greater stability in mounting of the insert.

According to an aspect of the disclosure, the insert for the cutting tool includes at least two recesses. By providing at least two recesses, the insert can be indexable to at least two positions by causing the at least one abutment member to be received in one or the other of the recesses.

According to an aspect of the disclosure, the recess supporting surface(s) of the insert of the cutting tool is/are radiused surface(s). Such simple shapes facilitate manufacture of inserts by techniques such as pressing and sintering of tungsten carbide.

According to an aspect of the disclosure, the insert includes a plurality of cutting edges, each cutting edge corresponding to a respective recess. By providing a plurality of cutting edges, the insert can be indexed to a plurality of different positions on the toolholder.

According to an aspect of the disclosure, the toolholder includes an insert abutment surface that defines a non-zero angle with respect to the bottom abutment surface, and the insert has at least one side supporting surface, one of the at least one side supporting surfaces being moved toward the side abutment surface when the clamping screw is tightened relative to the toolholder and the insert and moves the insert in the first direction. By providing this structure, flexibility in the design of the toolholder and cutting tool is enhanced as the number of side abutment surfaces on a toolholder can be minimized.

According to an aspect of the disclosure, the toolholder includes two abutment members extending from the side wall of the projection in radial directions, the abutment members each being closer to the central axis of the projection than to the central axis of the internally threaded opening. By providing this structure, flexibility in the design of the toolholder and cutting tool is enhanced as the number of side abutment surfaces on a toolholder can be minimized or eliminated entirely.

In accordance with yet another aspect of the present disclosure, a cutting insert includes a bottom surface, a top surface, and a through-hole extending from the bottom surface to the top surface, the through-hole having an internal, cylindrical wall portion and an inverted truncated conical insert clamping surface between the cylindrical wall and the top surface. The through-hole includes a plurality of recesses having recess supporting surfaces in the cylindrical wall.

The insert as described can be accurately mounted on a toolholder because a distance between a cutting edge of the insert and an abutment surface against which recess supporting surfaces abut can be minimized. In addition, the recess supporting surfaces can extend to a substantial height in the insert by the clamping surface and can abut corresponding, high abutment surfaces, facilitating greater stability in mounting of the insert.

According to an aspect of the disclosure, the cylindrical wall of the insert is generally circularly cylindrical. Such a shape facilitates manufacture of inserts by techniques such as pressing and sintering of tungsten carbide powder.

According to an aspect of the disclosure, the recess supporting surfaces of the insert are radiused surfaces. Such shapes facilitate manufacture of inserts by techniques such as pressing and sintering of tungsten carbide powder.

According to an aspect of the disclosure, the insert includes a plurality of cutting edges, each cutting edge corresponding to a respective pair of recesses. By this structure, an indexable insert can be well-supported relative to a toolholder by means that provide substantial flexibility with respect to the design of the toolholder.

According to an aspect of the disclosure, the top and bottom surfaces of the insert are identical, the through-hole includes a second inverted truncated conical insert clamping surface between the cylindrical wall and the bottom surface, and the insert is reversible. By this structure, the life of the insert can be extended substantially by indexing the insert by turning it over.

According to an aspect of the disclosure, the corner of the insert has a plurality of discrete elongated portions and a plurality of discrete transition portions, each transition portion being disposed between a respective pair of elongated portions, each elongated portion having a corresponding recess directed toward the elongated portion and centered along a line extending from the central axis of the through-hole and bisecting the elongated portion. This structure facilitates positioning of abutment members in recesses of the insert in locations that will provide firm support for the insert, without the need for side abutment surfaces.

According to an aspect of the disclosure, material of the cylindrical wall defining spaces between the recesses defines an arc of a circle, the recesses extend over arcs of the circle of the cylindrical wall that are about 20 degrees, and arcs of the circle between each recess are equal to or greater than arcs of the circle across each of the recesses. Such shapes facilitate manufacture of inserts by techniques such as pressing and sintering of tungsten carbide powder.

According to an aspect of the disclosure, the recesses extend to the clamping surface.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
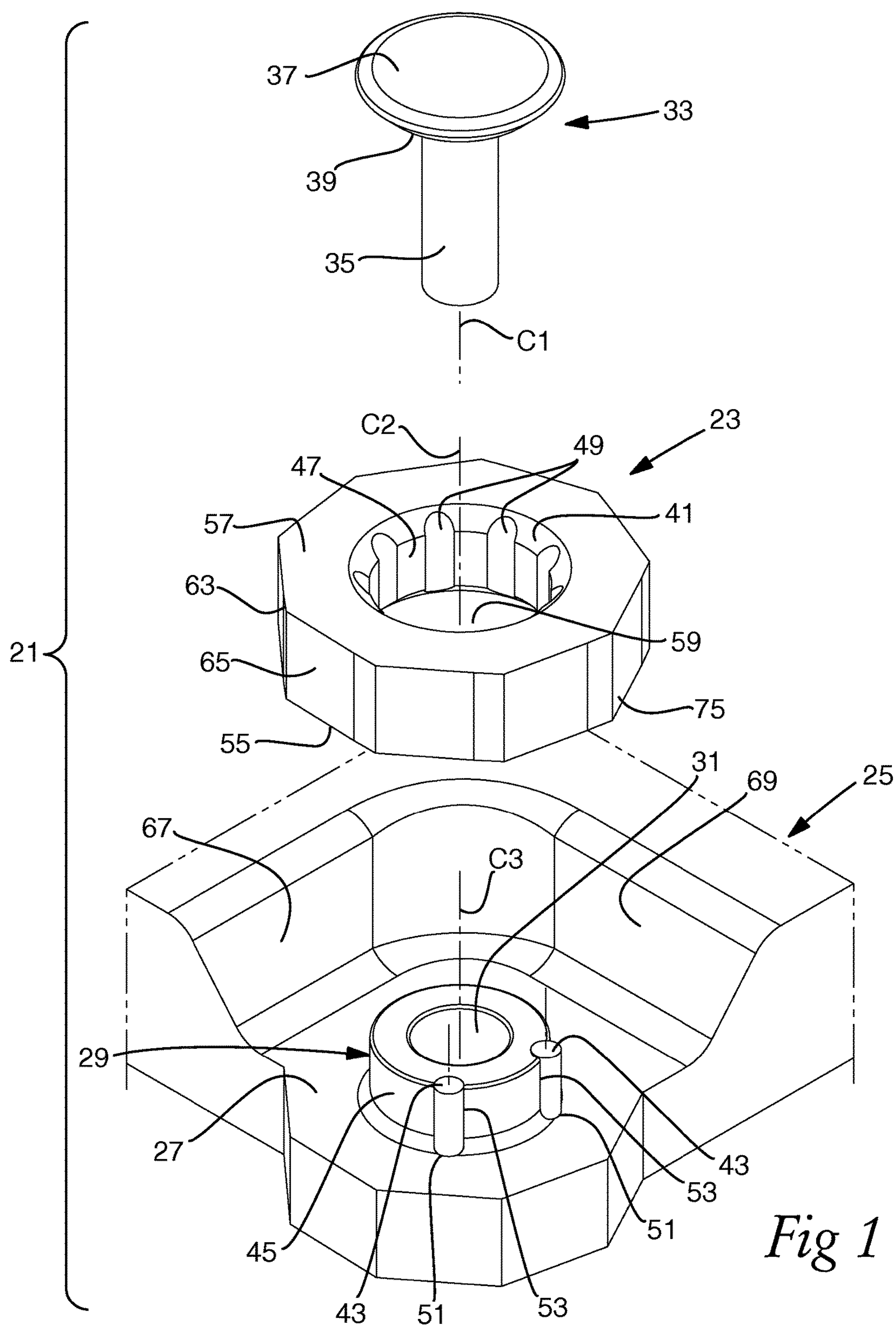
FIG. 1 is an exploded top perspective view of a cutting tool according to an aspect of the present disclosure.
Figure 2:
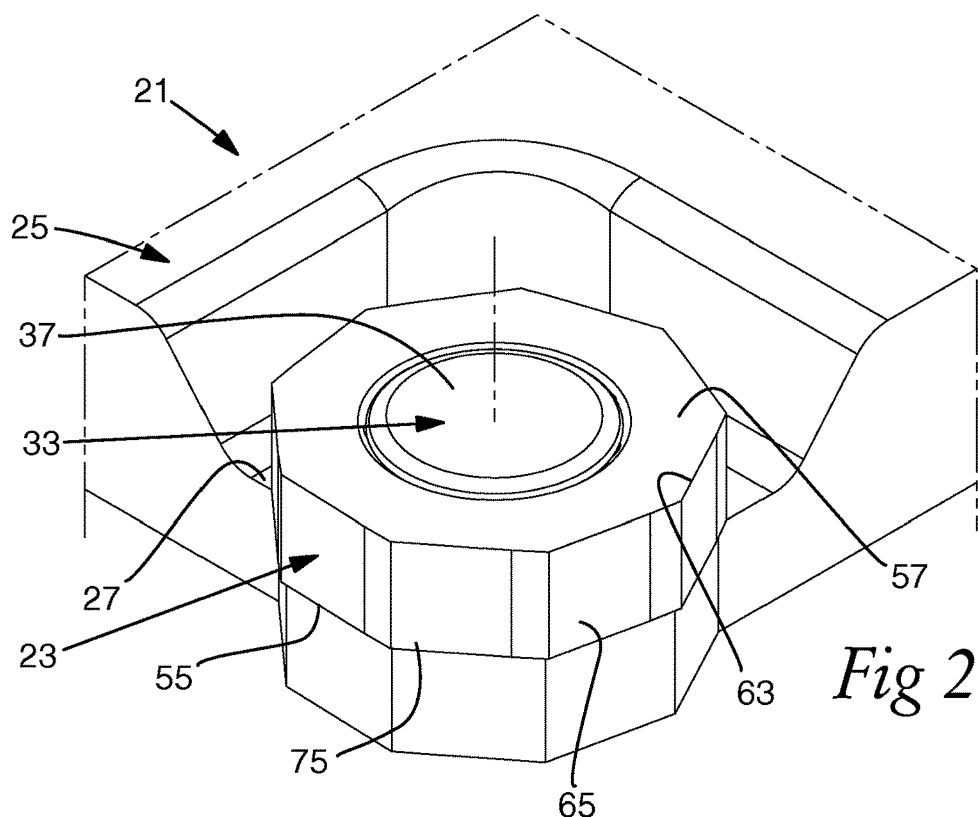
FIG. 2 is a top perspective view of the cutting tool of FIG. 1.
Figure 3:
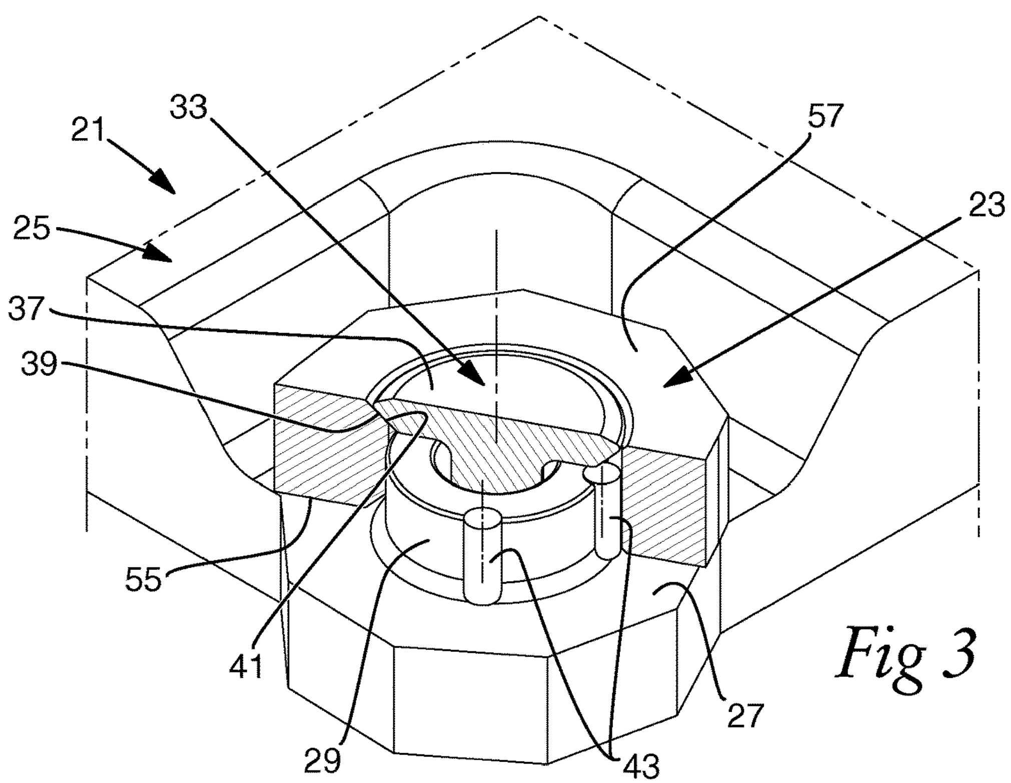
FIG. 3 is a partially cross-sectional top perspective view of the cutting tool of FIG. 1.
Figure 6:
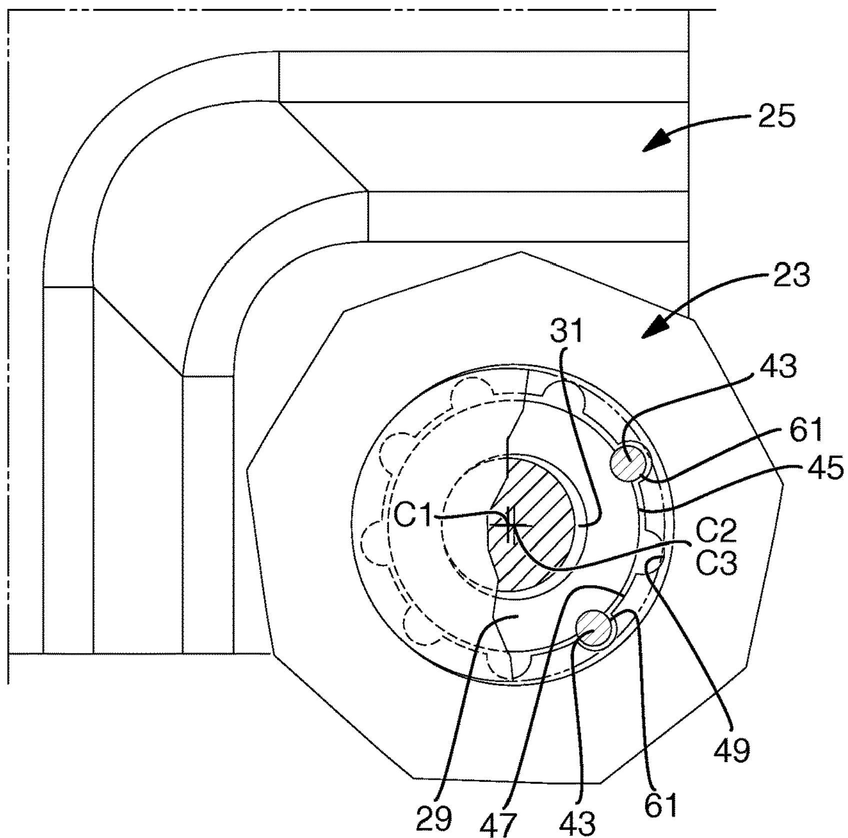
FIG. 6 is a top plan, partially cross-sectional view of a cutting tool according to an aspect of the present disclosure prior to completely clamping of a cutting insert relative to a toolholder with a clamping screw.
Figure 7:
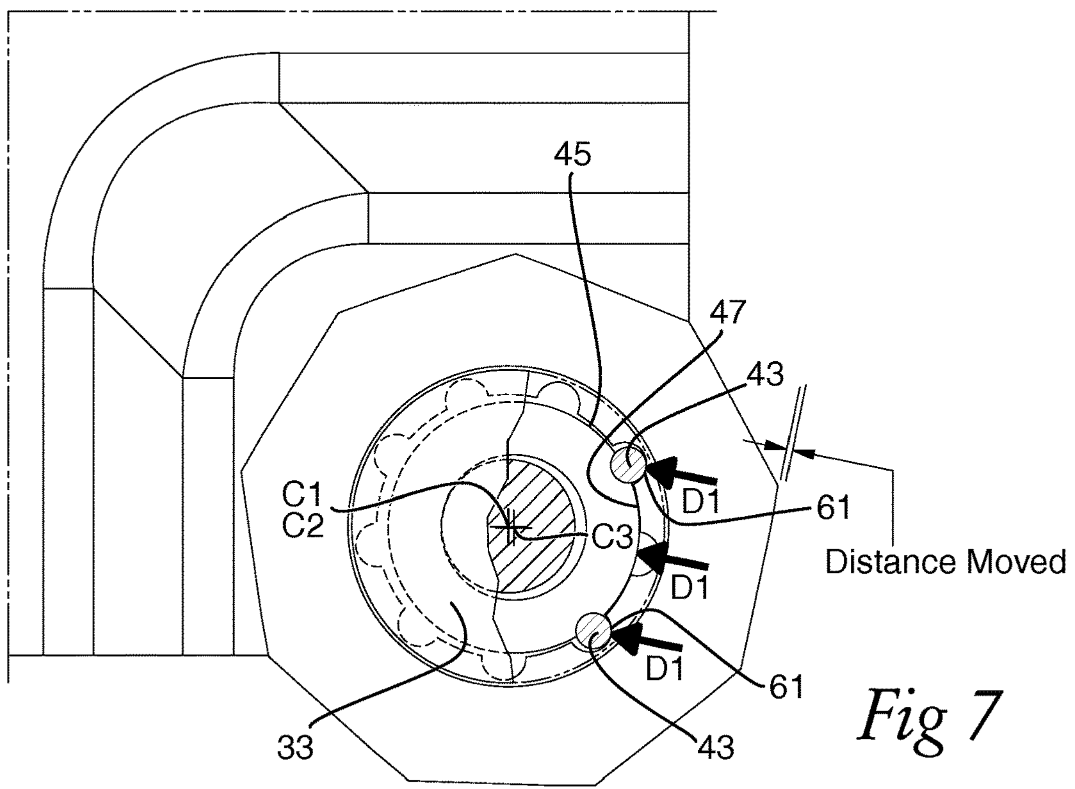
FIG. 7 is a top plan, partially cross-sectional view of the cutting tool of FIG. 6 after clamping of the cutting insert relative to the toolholder with the clamping screw.

FIGS. 1-3 show a cutting tool 21 according to an aspect of the present disclosure. The cutting tool 21 includes a cutting insert 23 mounted to a toolholder 25. As seen, for example, in FIGS. 1 and 3, the toolholder 25 has a bottom abutment surface 27 and a projection 29 extending upwardly from the bottom abutment surface. The projection 29 includes an internally threaded opening 31 (e.g., FIGS. 1 and 4). The internally threaded opening 31 has a central axis C1 that is offset from a central axis C3 of the projection 29 in a first direction D1 (from C3 to C1) as seen in FIGS. 6 and 7.

The toolholder 25 further includes a clamping screw 33 having external threads 35 for mating with internal threads of the internally threaded opening 31 and a head 37 having a bottom clamping surface 39 shaped as a truncated cone (FIGS. 1 and 3). As seen, for example, with reference to FIGS. 6 and 7, when the bottom clamping surface 39 of the head 37 contacts a correspondingly shaped insert clamping surface 41 on the cutting insert 23, the insert is urged in (or substantially in) the first direction D1 when the clamping screw 33 is tightened relative to the toolholder 25 and the insert 23. While the insert 23 will ordinarily be moved in the first direction D1 when the clamping screw is tightened, the insert may not necessarily be moved in exactly the same direction as the first direction, such as if the insert contacts an abutment surface as in the embodiment shown in FIGS. 8 and 9 and moves at an angle to the first direction over at least some portion of its movement. The central axis C1 of the internally threaded opening 31 is the same as the central axis of the screw 33 when the screw is screwed into the internally threaded opening.

Figure 5:
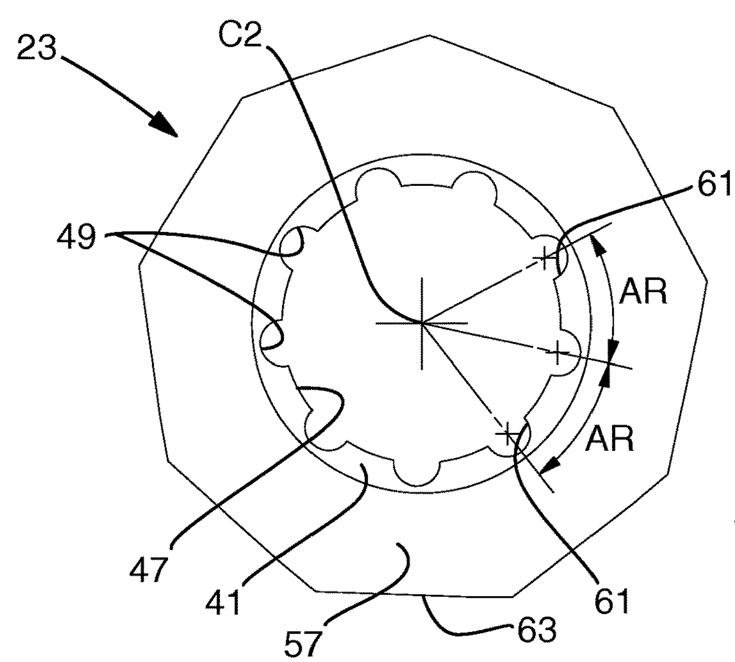
FIG. 5 is a top plan view of a cutting insert according to an aspect of the present disclosure.

The toolholder 25 further includes at least two abutment members 43 extending from a side wall 45 of the projection 29 in radial directions. At least abutment points on the abutment members 43 are closer to the central axis C3 of the projection 29 than to the central axis C1 of the internally threaded opening 31 when measured in a plane perpendicular to the axes C1 and C3. Typically, the entire abutment member 43 is closer to the central axis C3 of the projection 29 than to the central axis C1 of the internally threaded opening. This is, for example, typically the case when the abutment members are in the form of circularly cylindrical pins as shown in, for example, FIGS. 1, 6, and 7. Abutment points on the abutment members 43 are defined as the forwardmost points on the abutment members facing the first direction D1. The abutment points on the abutment members contact corresponding supporting points of recess supporting surfaces 61 (FIGS. 5-7).

The projection 29 is typically but not necessarily generally circularly cylindrical, and an internal cylindrical wall 47 of the insert 23 is also typically but not necessarily generally circularly cylindrical. The internal cylindrical wall 47 of the insert 23 includes recesses 49 for receiving the abutment members 43. Providing generally circularly cylindrical shapes to the projection 29 and the internal cylindrical wall 47 of the insert 23 can facilitate indexing of the insert relative to the toolholder 25, although the insert may be indexed even if the shapes of the projection and internal cylindrical wall are not circular. The shapes may be "generally" circularly cylindrical in the sense that the abutment members 43 or the recesses 49 are spaced around the surfaces and prevent them from being perfectly circularly cylindrical.

As seen in FIGS. 1 and 3-7, the abutment members 43 can be circularly cylindrical pins, although the abutment members may be provided in a variety of suitable forms, such as by being machined together with the projection 29 or secured to the projection by means such as brazing. Providing the abutment members 43 as circularly cylindrical pins permits the abutment members to be easily mounted in holes 51 (FIGS. 1, 3, and 4) formed in the bottom abutment surface 27 and recesses 53 formed in the projection and, in the event of damage to the abutment members, removed from the holes and recesses. The circularly cylindrical shape of the abutment members 43 is also ordinarily relatively simple to manufacture. Use of easily removable abutment members 43 facilitates replacement of the abutment members in the event of damage which is not possible with conventional abutment surfaces that form surfaces of walls of pockets machined into blocks of material that form the toolholder. Recesses 53 in the projection 29 for the abutment members 43 in the form of replaceable pins will typically, but do not necessarily, extend parallel to the central axis C3 of the projection and perpendicular to the bottom abutment surface 27.

The cutting insert 23 has a bottom supporting surface 55 for supporting the insert against the bottom abutment surface 27, a top surface 57, and a through-hole 59 for receiving the projection 29. The through-hole 59 extends from the bottom supporting surface 55 to the top surface 57. The through-hole 59 comprises the internal, cylindrical wall portion 47 and an inverted truncated conical insert clamping surface 41 between the cylindrical wall and the top surface 57. As seen, for example, in FIGS. 1, 3, and 5-7, the through-hole 59 is a plurality of recesses 49 having recess supporting surfaces 61 (FIGS. 5-7) in the cylindrical wall 47 arranged to receive the abutment members 29 so that the abutment members abut against the recess supporting surfaces 61 when the clamping screw 33 is tightened relative to the toolholder 25 and the insert 23 and moves the insert in the first direction D1 through the distance moved illustrated in FIG. 7. The recesses 49 can extend to the insert clamping surface 41 and the bottom clamping surface 39 of the head 37 of the clamping screw 33 is preferably of sufficient size to cover all of the recesses to minimize the possibility of any chips from a workpiece falling into the recesses.

A corner 63 is formed at an intersection of the top surface 57 and a side wall 65 of the insert 23. All or part of the corner 63 forms a plurality of different cutting edges when the insert 23 is indexed relative to the toolholder 25. The insert 23 can have a plurality of cutting edges as seen in FIG. 1 (showing nine discrete straight-edge corner portions that can form parts of up to nine separate cutting edges) or the cutting edges may be formed as portions of, for example, an insert having a circular shape when viewed along a central axis C2 of the through-hole 59 of the insert. The insert 23 has at least two recesses 49 for receiving the abutment members 43 and, more typically, at least three recesses 49 spaced such that the insert can be indexed relative to the at least two abutment members 43 on the toolholder 25 to at least two different positions to expose two or more different portions of the cutting edge. Each cutting edge corresponds to a respective pair of recesses 49 in which the abutment members 43 are received when the particular cutting edge is in a working position relative to the toolholder 25. In the embodiment shown in FIG. 5, for example, there are nine elongated (and straight) portions of the corner 63 and nine transition portions disposed between respective pairs of the elongated portions. The elongated portions each have a corresponding recess 49 directed toward the elongated portion of the corner, typically centered along a line extending from the central axis C2 of the through-hole 59 and bisecting the elongated portion of the corner.

As seen in the illustrative insert 23 shown in, e.g., FIGS. 1 and 5, an insert may have nine recesses 49 spaced at angles AR of 40 degrees around the central axis C2 of the through-hole 59 and can be indexed to up to nine different positions relative to the two abutment members 43 on the projection 29. At least when the abutment members 43 have radiused external surfaces, as when they are formed from circular pins, the recesses 49 are typically formed as radiused surfaces and, even if the entire recess 49 is not formed as a radiused surface, at least the recess supporting surfaces 61 are typically formed as radiused surfaces. The radii of the recesses 49 and/or the recess supporting surfaces 61 is at least as large as and, typically, slightly larger than the radii of the abutment members 43 to permit the abutment members to be received in the recesses. The recesses 49 seen in the embodiment shown in FIG. 5 are in the form of generally circular arcs of about 180 degrees. The arcs may be smaller than 180 degrees, however, typically not less than about 90 degrees.

The recesses 49 and the non-recessed portion of the internal cylindrical wall 47 together preferably define a cylinder. Longitudinal axes of the recesses 49 and the longitudinal axis of the internal cylindrical wall 47, i.e., the axis C2 of the insert through-hole 59 are preferably perpendicular to a plane of the bottom surface 57 and, typically, to a plane of the top surface 55 of the insert 23.

When the internal cylindrical wall 47 is generally circularly cylindrical, the radius of the internal cylindrical wall is typically between about 3-10 times as large as the radii of the recesses 49 and/or the recess supporting surfaces 61 and, more preferably, between 5-7 times as large. When the internal cylindrical wall 47 is generally circularly cylindrical, the material of the internal cylindrical wall defining spaces between the recesses 49 typically defines an arc of a circle. The size of the arc of the circle depends upon the size and number of the recesses 49 relative to the size of the internal cylindrical wall 47. In an insert 23 as shown in FIG. 5 that has nine recesses 49 that are approximately ⅙ the size of the diameter of the generally circularly cylindrical internal cylindrical wall 47, the material of the internal cylindrical wall between the recesses defines an arc of a circle that is about 20 degrees. The nine recesses 49, likewise, extend over arcs of the circle of the generally circularly cylindrical internal cylindrical wall 47 that are about 20 degrees. Thus, while not necessarily true of all embodiments of the insert 23, the arc of the circle between each recess is roughly equal to or greater than the arc of the circle across each of the recesses 49.

Figure 4:
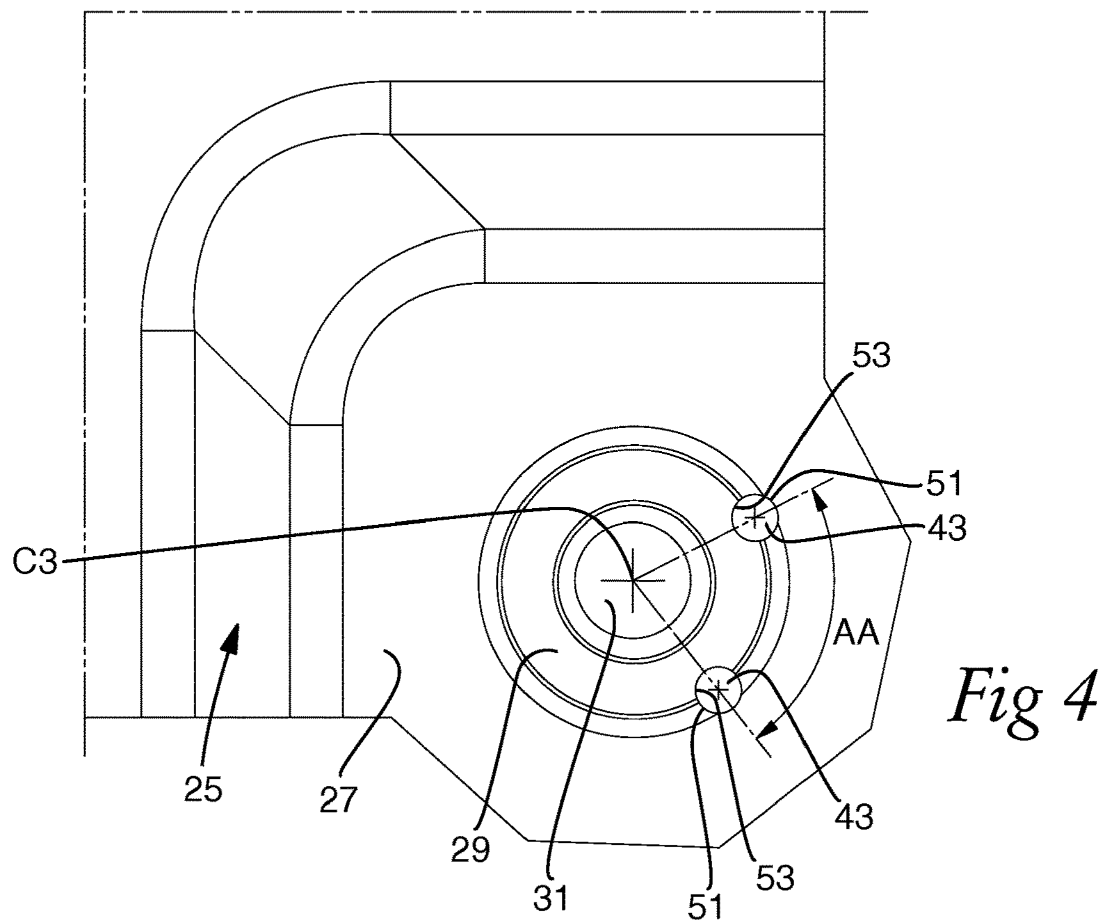
FIG. 4 is a top plan view of a portion of a toolholder according to an aspect of the present disclosure.

As seen in the illustrative toolholder 25 shown in, e.g., FIGS. 1 and 4, the abutment members 43 are typically spaced at an angle AA around the central axis C3 of the projection 29 that is slightly less than an angle between the two recesses 49 of the insert 23 in which the abutment members 43 are to be received. For example, in the case of the abutment members 43 shown in the cutting tool 21 of FIG. 1 for use with the insert 23 having nine recesses 49 spaced at 40 degrees around the insert opening axis C2, the abutment members might be at an angle of 79 degrees around the central axis C3 of the projection 29 as they are intended to be received in recesses 49 in the insert that are spaced at 80 degrees around the insert opening axis.

By arranging the abutment members 43 so that they define a slightly smaller angle about the central axis C3 of the projection than the angle that the recesses 49 in which they are to be received define about the insert opening axis C2, when the insert 23 is moved in the first direction D1 when the clamping screw 33 is tightened relative to the toolholder 25 and the insert, i.e., moved from the position shown in FIG. 6 to the position shown in FIG. 7, the radiused surfaces of the abutment members 43 will tend to contact the recesses 49 on parts of the recesses that are closest to each other as seen in FIG. 7. This will tend to minimize any tendency of the insert to move relative to toolholder during a cutting operation. The abutment members 43 may be but need not be received in consecutive ones of the recesses 49. Arranging the abutment members 43 so that they are received in non-consecutive ones of the recesses 49 can help to provide good, evenly spaced support for the insert 23 on the toolholder 25.

Where the toolholder 25 has two abutment members 43, it may, but need not, further have one or more additional side surfaces 67 and 69 that define non-zero angles with respect to the bottom abutment surface 27 and with respect to each other. Because the side surfaces 67 and/or 69 can ordinarily be entirely omitted, this provides substantially greater design flexibility for the toolholder 25. If side surfaces 67 and/or 69 are provided, part or all of the side wall 65 of the insert 23 may comprise one (particularly in the case of a circular insert) or a plurality of side insert surfaces which are moved toward but do not contact the side surfaces 67 and 69 when the clamping screw 33 is tightened relative to the toolholder 25 and the insert 23 and moves the insert in the first direction D1. To avoid overdetermination, the side insert surfaces will ordinarily not contact the side surfaces 67 and 69 at all, however, there may be some contact in some designs when cutting forces urge the insert 23 in the first direction D1. The abutment members 43 will contact the recess supporting surfaces 61 in the recesses 49 before the side surfaces 67 and 69 and the side insert surfaces come into contact. In this way, the brunt of the forces on the insert 23 during a cutting operation will be borne by the abutment members 43 rather than the side surfaces 67 and 69, which can be useful if the abutment members 43 are in a form such that they can be easily replaced. As is seen in FIGS. 6 and 7, in the cutting tool 21, no part of the insert 23 contacts side insert abutment surfaces 67 and 69 in the pocket.

Moreover, because the abutment members 43 function as replacements for traditional side abutment surfaces and can be located relatively close to the working cutting edges as compared to side abutment surfaces, this can reduce the effect of size variations in the insert. For example, in a conventional insert, the position of the cutting edge relative to the toolholder is dependent upon the distances from the points at which the side insert supporting surfaces contact the side abutment surfaces to the cutting edge whereas, in an insert as described herein, the position of the cutting edge relative to the toolholder is dependent upon the much shorter distances from the points at which the abutment members 43 contact the recess supporting surfaces 61 to the cutting edge. A variation in insert size will have less impact on the location of the cutting edge in a cutting tool according to aspects of the present invention than in a conventional cutting tool.

As can be appreciated from, for example, in FIG. 3, the abutment members 43 can contact the recess supporting surfaces 61 close to the top surface 57 of the insert, near the point of contact between the clamping surfaces 39 and 41 of the clamping screw 33 and the insert 23. This feature can facilitate support of the insert 23 relative to the toolholder 25 and the projection 29, particularly as compared to other "bottom support" style inserts that involve projections that only extend a minimal distance above a bottom abutment surface of the toolholder. Moreover, this feature can facilitate avoidance of any tendency of an insert to climb up a bottom support-style projection that might occur as the result of cutting forces on the insert when side surfaces of the projection are sloped or of minimal height.

The top and bottom surfaces 57 and 55 of the insert 23 may be identical, and the through-hole 59 may have a second inverted truncated conical insert clamping surface 73 (FIG. 3) between the cylindrical wall 47 and the bottom surface 55. By such a structure, an insert 23 that is indexable by being reversible, i.e., capable of being flipped over to permit use of cutting edges at a corner 75 defined by the intersection of the side wall 65 of the insert with the bottom surface 55 can be provided.

Figure 8:
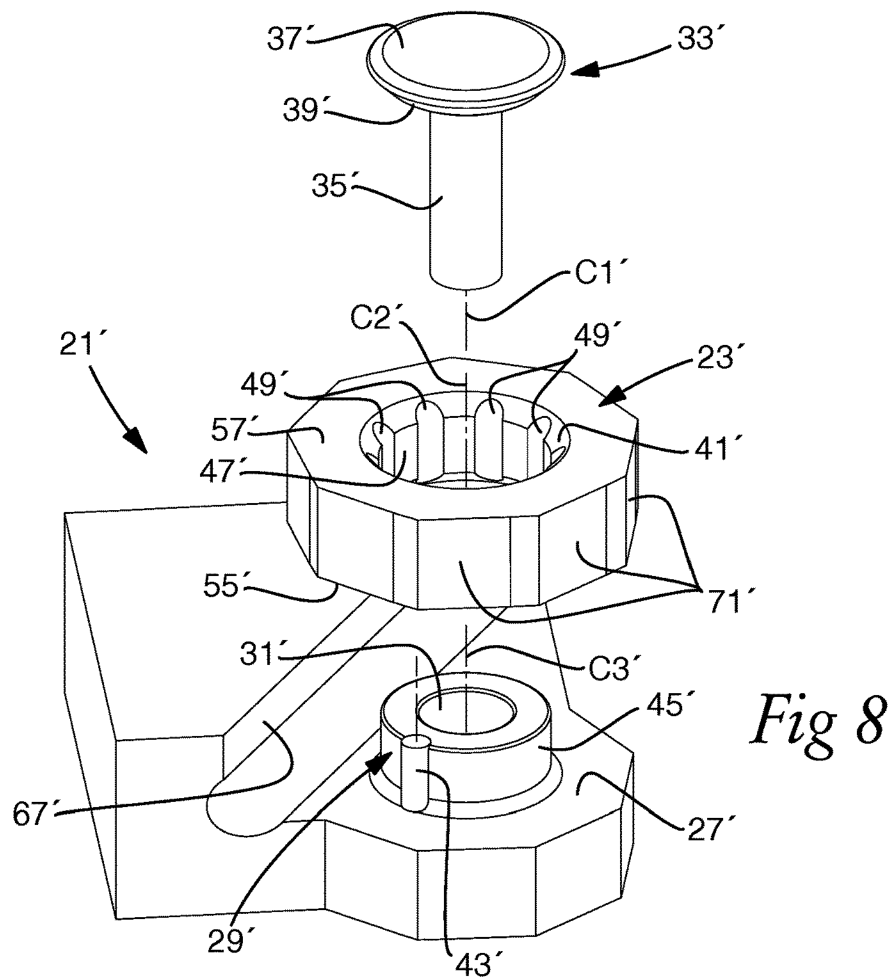
FIG. 8 is a partially exploded, top perspective view of a cutting tool according to another aspect of the present disclosure.
Figure 9:
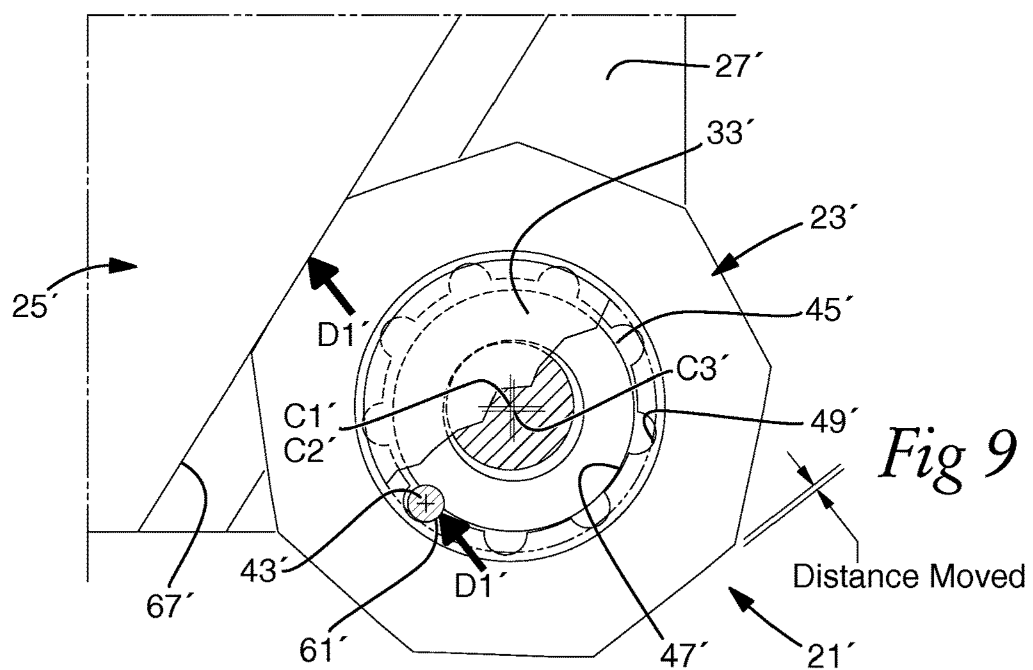
FIG. 9 is a top plan, partly cross-sectional view of the cutting tool of FIG. 8 after clamping of the cutting insert relative to the toolholder with the clamping screw.

A cutting tool 21' according to another embodiment is shown in FIGS. 8 and 9 and includes a toolholder 25' that includes a single abutment member 43' and an insert abutment surface 67' that defines a non-zero angle with respect to the bottom abutment surface 27'. The insert 23' has at least one and, more typically, a plurality of side supporting surfaces 71'. One of the side supporting surfaces 71' is moved toward the side abutment surface 67' when the clamping screw 33' is tightened relative to the toolholder 25' and the insert 23' and moves the insert in the first direction D1. In this way, three points of contact are obtained between: 1—the insert 23' and the bottom abutment surface 27'; 2—the insert 23' and the abutment member 43'; and 3—the insert 23' and the insert abutment surface 67'. The toolholder 25' shown in FIGS. 8 and 9 may have all of the features of the toolholder 25 shown in FIGS. 1-4 and 6-7, except that the toolholder shown in FIGS. 8 and 9 includes the insert abutment surface 67' in order to provide three points of contact with the insert 23'. The axis C1 of the internally threaded opening 31' in the projection 29' is typically located so that the first direction D1' is generally in a direction of a line defined by the point of contact between the insert 23' and the insert abutment surface 67' and the point of contact between the insert 23' and the abutment member 43. The insert 23' for the toolholder 25' shown in FIGS. 8 and 9 may be identical to the insert 23 used in the embodiment shown in FIGS. 1-7, however, the insert for the toolholder shown in FIGS. 8 and 9 need only include one recess 61' and, to be indexable, only needs two recesses, whereas the insert in the embodiment shown in FIGS. 1-7 requires at least two recesses 61 and, to be indexable, requires at least three recesses.

In the present application, the use of terms such as "including" is open-ended and is intended not to preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A toolholder comprising:

a bottom abutment surface;

a projection extending upwardly from the bottom abutment surface, the projection including an internally threaded opening, the internally threaded opening having a central axis that is offset from a central axis of the projection in a first direction;

a clamping screw having external threads for mating with internal threads of the internally threaded opening and a head having a bottom clamping surface shaped as a truncated cone for contacting an insert clamping surface and urging an insert in substantially the first direction when the clamping screw is tightened relative to the toolholder and the insert; and at least one abutment member extending from a side wall of the projection in a radial direction, each abutment member having an abutment point, at least the abutment point of the at least one abutment member being closer to the central axis of the projection than to the central axis of the internally threaded opening.

2. The toolholder according to claim 1, wherein the projection is generally circularly cylindrical.

3. The toolholder according to claim 1, wherein each of the at least one abutment members is a circularly cylindrical pin.

4. The toolholder according to claim 3, wherein each pin is partially disposed in a respective recess in the projection that extends parallel to the central axis of the projection.

5. A cutting tool comprising:

a toolholder including a bottom abutment surface, a projection extending upwardly from the bottom abutment surface, the projection including an internally threaded opening, the internally threaded opening having a central axis that is offset from a central axis of the projection in a first direction, a clamping screw having external threads for mating with internal threads of the internally threaded opening and a head having a bottom clamping surface shaped as a truncated cone for contacting an insert clamping surface and urging an insert in substantially the first direction when the clamping screw is tightened relative to the toolholder and the insert, and at least one abutment member extending from a side wall of the projection in a radial direction, each abutment member having an abutment point, at least the abutment point of the at least one abutment member being closer to the central axis of the projection than to the central axis of the internally threaded opening; and a cutting insert attachable to the toolholder, the insert including a bottom supporting surface for supporting the insert against the bottom abutment surface, a top surface, and a through hole for receiving the projection extending from the bottom supporting surface to the top surface, the through hole including an internal, cylindrical wall portion and an inverted truncated conical insert clamping surface between the cylindrical and the top surface, wherein the through hole includes a plurality of recesses having recess supporting surfaces in the cylindrical wall arranged to receive the at least one abutment member so that the abutment point of each abutment member of the at least one abutment member abuts against a corresponding one of the recess supporting surfaces when the clamping screw is tightened relative to the toolholder and the insert and moves the insert in the first direction.

6. The cutting tool according to claim 5, wherein the insert includes at least two recesses.

7. The cutting tool according to claim 5, wherein the recess supporting surfaces are radiused surfaces.

8. The cutting tool according to claim 5, wherein the insert includes a plurality of cutting edges, each cutting edge corresponding to a respective recess supporting surface.

9. The cutting tool according to claim 5, wherein the insert abutment surface defines a non-zero angle with respect to the bottom abutment surface, the insert having at least one side supporting surface, wherein one of a plurality of at least one side supporting surfaces being moved toward the side abutment surface when the clamping screw is tightened relative to the toolholder and the insert and moves the insert in the first direction.

10. The cutting tool according to claim 5, wherein the toolholder includes two abutment members extending from the side wall of the projection in radial directions, the abutment members each being closer to the central axis of the projection than to the central axis of the internally threaded opening.

11. A cutting insert comprising:

a bottom surface;

a top surface spaced from and parallel with the bottom surface; and a through hole extending from the bottom surface to the top surface, the through hole including an internal, circular cylindrical wall portion, an inverted truncated conical insert clamping surface between the circular cylindrical wall portion and the top surface, and a plurality of recesses having recess supporting surfaces located in the circular cylindrical wall portion, wherein each of the plurality of recesses extend to and terminate in the clamping surface.

12. The cutting insert according to claim 11, wherein at least the recess supporting surfaces are radiused surfaces.

13. The cutting insert according to claim 11, wherein the insert includes a plurality of cutting edges, each cutting edge corresponding to a respective pair of recesses.

14. The cutting insert according to claim 11, wherein the top and bottom surfaces are identical, the through hole including a second inverted truncated conical insert clamping surface between the cylindrical wall and the bottom surface, and the insert is reversible.

15. The cutting insert according to claim 13, further comprising a corner, the corner including a plurality of discrete elongated portions and a plurality of discrete transition portions, each transition portion being disposed between a respective pair of elongated portions, each elongated portion having a corresponding recess directed toward the elongated portion and centered along a line extending from the central axis of the through hole and bisecting the elongated portion.

16. The cutting insert according to claim 11, wherein material of the cylindrical wall defining spaces between the recesses defines an arc of a circle, the recesses extending over arcs of the circle of the cylindrical wall that are about 20 degrees, and arcs of the circle between each recess are equal to or greater than arcs of the circle across each of the recesses.

* * * * *